US010968905B2

(12) United States Patent
Weinberg

(10) Patent No.: US 10,968,905 B2
(45) Date of Patent: Apr. 6, 2021

(54) PRODUCING COMPRESSED AIR FROM OCEAN WAVES

(71) Applicant: Reuven Weinberg, Givatayim (IL)

(72) Inventor: Reuven Weinberg, Givatayim (IL)

(73) Assignee: Reuven Weinberg, Givatayim (IL)

(*) Notice: Subject to any disclaimer, the term of this patent is extended or adjusted under 35 U.S.C. 154(b) by 99 days.

(21) Appl. No.: 16/331,155

(22) PCT Filed: Sep. 4, 2017

(86) PCT No.: PCT/IL2017/050985
§ 371 (c)(1),
(2) Date: Mar. 7, 2019

(87) PCT Pub. No.: WO2018/051329
PCT Pub. Date: Mar. 22, 2018

(65) Prior Publication Data
US 2019/0234370 A1 Aug. 1, 2019

(30) Foreign Application Priority Data
Sep. 14, 2016 (GB) .................................... 1615649

(51) Int. Cl.
F04B 35/00 (2006.01)
F03B 13/18 (2006.01)
(Continued)

(52) U.S. Cl.
CPC .......... F04B 35/004 (2013.01); F03B 13/187 (2013.01); F03B 13/1875 (2013.01);
(Continued)

(58) Field of Classification Search
CPC .......... F04B 23/02; F04B 23/04; F04B 23/06; F04B 41/02; F04B 35/004; F04B 49/035;
(Continued)

(56) References Cited

U.S. PATENT DOCUMENTS 2,706,077 A 4/1955 Searcy
3,664,125 A * 5/1972 Strange ................ F03B 13/187
60/398

(Continued)

FOREIGN PATENT DOCUMENTS

| WO | 2009022930 A1 | 2/2009 |
| WO | 2009083965 A2 | 7/2009 |
| WO | 2011162817 A1 | 12/2011 |

Primary Examiner — Bryan M Lettman
(74) Attorney, Agent, or Firm — Soroker Agmon Nordman

(57) ABSTRACT

A system and method for producing compressed air from ocean waves. The system includes an enclosing frame having a base anchored to an ocean floor with two or more columns extending upward from the base to above the ocean surface and a platform at an upper end of the columns. A float is located in the frame between the columns so that the float is confined to go up and down. The float is placed on the ocean surface within the frame and goes up and down with the ocean waves. One or more pumps are located on the platform with the hammer head that can be raised and lowered to produce compressed air with the pumps. The hammer head is connected to the float with two or more elongated shafts so that the hammer head is raised and lowered by the ocean waves and produces compressed air.

18 Claims, 6 Drawing Sheets

(51) Int. Cl.
*F04B 41/06* (2006.01)
*F04B 49/02* (2006.01)
*F04B 41/02* (2006.01)
*F03B 13/24* (2006.01)

(52) U.S. Cl.
CPC .............. *F03B 13/24* (2013.01); *F04B 41/02* (2013.01); *F04B 41/06* (2013.01); *F04B 49/02* (2013.01); *Y02E 10/30* (2013.01)

(58) Field of Classification Search
CPC .......... F04B 41/06; F04B 49/02; F04B 49/03; F03B 13/1875; F03B 13/187; F03B 13/24; F03B 13/16; F03B 13/18; F03B 13/1845; F03B 13/1855; F03B 13/186; F03B 13/188; Y02E 10/30
See application file for complete search history.

(56) References Cited

U.S. PATENT DOCUMENTS

| | | | |
|---|---|---|---|
| 3,879,950 A * | 4/1975 | Yamada | F03B 13/24 60/698 |
| 3,898,471 A | 8/1975 | Schera, Jr. | |
| 5,854,516 A | 12/1998 | Shim | |
| 6,574,957 B2 * | 6/2003 | Brumfield | F03B 13/266 60/398 |
| 6,849,963 B2 | 2/2005 | Grinsted | |
| 6,930,406 B2 | 8/2005 | Montgomery | |
| 7,492,054 B2 | 2/2009 | Catlin | |
| 8,308,449 B2 * | 11/2012 | Smith | F03B 13/187 417/331 |
| 8,492,917 B2 | 7/2013 | Al-Hasan | |
| 8,648,486 B2 | 2/2014 | Daqian | |
| 8,963,352 B2 * | 2/2015 | Healy | F03B 13/187 290/43 |
| 9,016,055 B2 | 4/2015 | Dragic | |
| 9,074,576 B1 | 7/2015 | Potts | |
| 9,103,316 B2 | 8/2015 | Park | |
| 9,109,570 B2 | 8/2015 | Jarvinen et al. | |
| 9,151,269 B2 | 10/2015 | Han | |
| 9,243,608 B1 | 1/2016 | Smith | |
| 9,315,397 B2 | 4/2016 | Sivret | |
| 2003/0155776 A1 | 8/2003 | Camp | |
| 2006/0202483 A1 | 9/2006 | Gonzalez | |
| 2007/0130929 A1 * | 6/2007 | Khan | F03B 13/185 60/398 |
| 2009/0165454 A1 * | 7/2009 | Weinberg | F03B 17/02 60/497 |
| 2011/0225964 A1 | 9/2011 | Welch, Jr. et al. | |
| 2012/0036992 A1 * | 2/2012 | Friedrich | F04B 49/03 91/418 |

* cited by examiner

PRODUCING COMPRESSED AIR FROM OCEAN WAVES

TECHNICAL FIELD

The present invention relates to a system for production of compressed air from ocean waves and more specifically an adjustable system to overcome the rise and fall of the tide.

BACKGROUND

In the last century the consumption of energy has increased enormously. Energy can be provided by burning oil, coal, wood and other materials. Energy may also be provided from clean sources such as from the sun or from water dams.

Another source for harnessing clean energy is from the kinetic motion of ocean waves. Many systems have been designed to harness the motion of ocean waves to produce compressed air that can then easily be utilized to produce electrical energy.

Systems for harnessing the ocean waves can be stationary or non-stationary, e.g. anchored to the floor of the ocean or floating on the surface of the ocean. Typically non-stationary systems are more susceptible to damage during bad weather since they may be knocked around violently.

One problem in dealing with ocean waves in many locations especially near the shore is that the tide can have a large effect on the height of the surface of the ocean making it problematic to construct stationary systems for producing compressed air. In some locations the difference between the height of the ocean surface can vary, for example up to 10 meters over time due to the tide.

SUMMARY

An aspect of an embodiment of the disclosure relates to a system and method for producing compressed air from ocean waves. The system includes an enclosing frame having a base anchored to the floor of the ocean with two or more columns extending upward from the base to above the surface of the ocean and a platform at an upper end of the columns. A float is located in the frame between the columns so that the float is confined to go up and down and not run away. The float is placed on the surface of the ocean within the frame and goes up and down with the ocean waves. One or more pumps are located on the platform with a hammer head that can be raised and lowered to produce compressed air with the pumps. The hammer head is connected to the float with two or more elongated shafts so that the hammer head is raised and lowered by the ocean waves and produces compressed air.

The elongated shafts are adjustable depending on the height of the surface of the ocean (e.g. due to the tide) so that the hammer head moves in a predefined motion range (responsive to the ocean waves) regardless of the height of the surface of the ocean. Thus when the tide is up or down (e.g. even with a height difference of up to 10 meters) the hammer head moves from a compressed position of the pump to a non-compressed position and vice versa only under the influence of the ocean waves. Optionally, the system may include sensors to measure the height of the water and a controller to accept the measurements of the sensors. The controller then calculates an adjustment and instructs a motor to adjust the length of the elongated shaft.

In an exemplary embodiment of the disclosure, the system also includes a hydraulic pump that can be located on the platform. Optionally, the hydraulic pump is also activated by the hammer head to produce hydraulic pressure for activating the motor and adjusting the length of the elongated shaft.

There is thus provided according to an exemplary embodiment of the disclosure, a system for producing compressed air from ocean waves, comprising:

a base for anchoring the system on an ocean floor;

two or more columns extending perpendicularly upward from said base to above a surface of the ocean;

a platform at an upper end of the columns;

one or more air pumps located on said platform;

a hammer head coupled to the air pumps for producing compressed air by raising and lowering the hammer head in a predefined motion range;

a float that floats on the surface of the ocean and is confined by the two or more columns, the base and the platform;

one or more elongated shafts coupled to said float at one end and to said hammer head at another end; wherein the hammer head is adapted to be raised and lowered by the float in the predefined motion range by the motion of the ocean waves; and wherein the elongated shafts have a length that is adjustable to keep the hammer head in the predefined motion range and the float on the surface of the ocean in response to a change in the height of the surface of the ocean.

In an exemplary embodiment of the disclosure, the length of the elongated shafts is adjusted automatically by a controller and a motor. Optionally, the controller receives measurements of the height of the surface of the ocean from sensors located on the columns. Alternatively or additionally, the controller receives measurements of the height of the surface of the ocean from a remote computer. In an exemplary embodiment of the disclosure, the system includes a hydraulic pump that provides hydraulic pressure to the motor to adjust the length of the elongated shafts. Optionally, when the hammer head is lifted it produces hydraulic pressure and when the hammer head is lowered it produces compressed air. In an exemplary embodiment of the disclosure, the system can selectively activate each air pump. Optionally, compressed air from the air pumps is stored in a reservoir. In an exemplary embodiment of the disclosure, each elongated shaft include an upper shaft connected to the hammer head, a lower shaft connected to the float and an adjusting rod in between; wherein when the adjusting rod is rotated in one direction its upper part increasingly overlaps the upper shaft and its lower part increasingly overlaps the lower shaft; and when the adjusting rod is rotated in an opposite direction its upper part decreasingly overlaps the upper shaft and its lower part decreasingly overlaps the lower shaft. Alternatively, each elongated shaft include an upper shaft connected to the hammer head, a lower shaft connected to the float and an adjusting rod in between; wherein when the adjusting rod is rotated in one direction its upper part increasingly overlaps the upper shaft; and when the adjusting rod is rotated in an opposite direction its upper part decreasingly overlaps the upper shaft; and wherein the lower shaft does not overlap with the adjusting rod. In an exemplary embodiment of the disclosure, each elongated shaft include an upper shaft connected to the hammer head, a lower shaft connected to the float and an adjusting rod in between; wherein the adjusting rod is threaded to be screwed into the upper shaft and/or the lower shaft. Optionally, the system includes one, or more support beams that keep multiple elongated shafts at an equidistance from each other. In an exemplary embodiment of the disclosure, the support beams include guide wheels that interface between the elongated shafts and the columns. In an exemplary embodiment of the disclosure, a motor for controlling the length of the elongated shafts is supported by a support beam. Optionally, the float includes valves for selectively filling the float with compressed air or ocean water.

There is further provided according to an exemplary embodiment of the disclosure, a method for producing compressed air from ocean waves, comprising:

anchoring a base on an ocean floor;

extending two or more columns perpendicularly upward from said base to above a surface of the ocean;

placing a platform at an upper end of the columns;

positioning one or more air pumps on said platform;

coupling a hammer head to the air pumps to produce compressed air by raising and lowering the hammer head in a predefined motion range;

confining a float that floats on the surface of the ocean by the base, platform and the two or more columns;

connecting one or more elongated shafts between said float and said hammer head, so that the hammer head is raised and lowered by the float in the predefined motion range by the motion of the ocean waves; and adjusting a length of the elongated shafts to keep the hammer head in the predefined motion range and the float on the surface of the ocean in response to a change in the height of the surface of the ocean.

In an exemplary embodiment of the disclosure, the length of the elongated shafts is adjusted automatically by a controller and a motor. Optionally, the controller receives measurements of the height of the surface of the ocean from sensors located on the columns. In an exemplary embodiment of the disclosure, the system includes a hydraulic pump that provides hydraulic pressure to the motor to adjust the length of the elongated shafts. Optionally, when the hammer head is lifted it produces hydraulic pressure and when the hammer head is lowered it produces compressed air.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear. It should be noted that the elements or parts in the figures are not necessarily shown to scale such that each element or part may be larger or smaller than actually shown.

DETAILED DESCRIPTION

Figure 1:
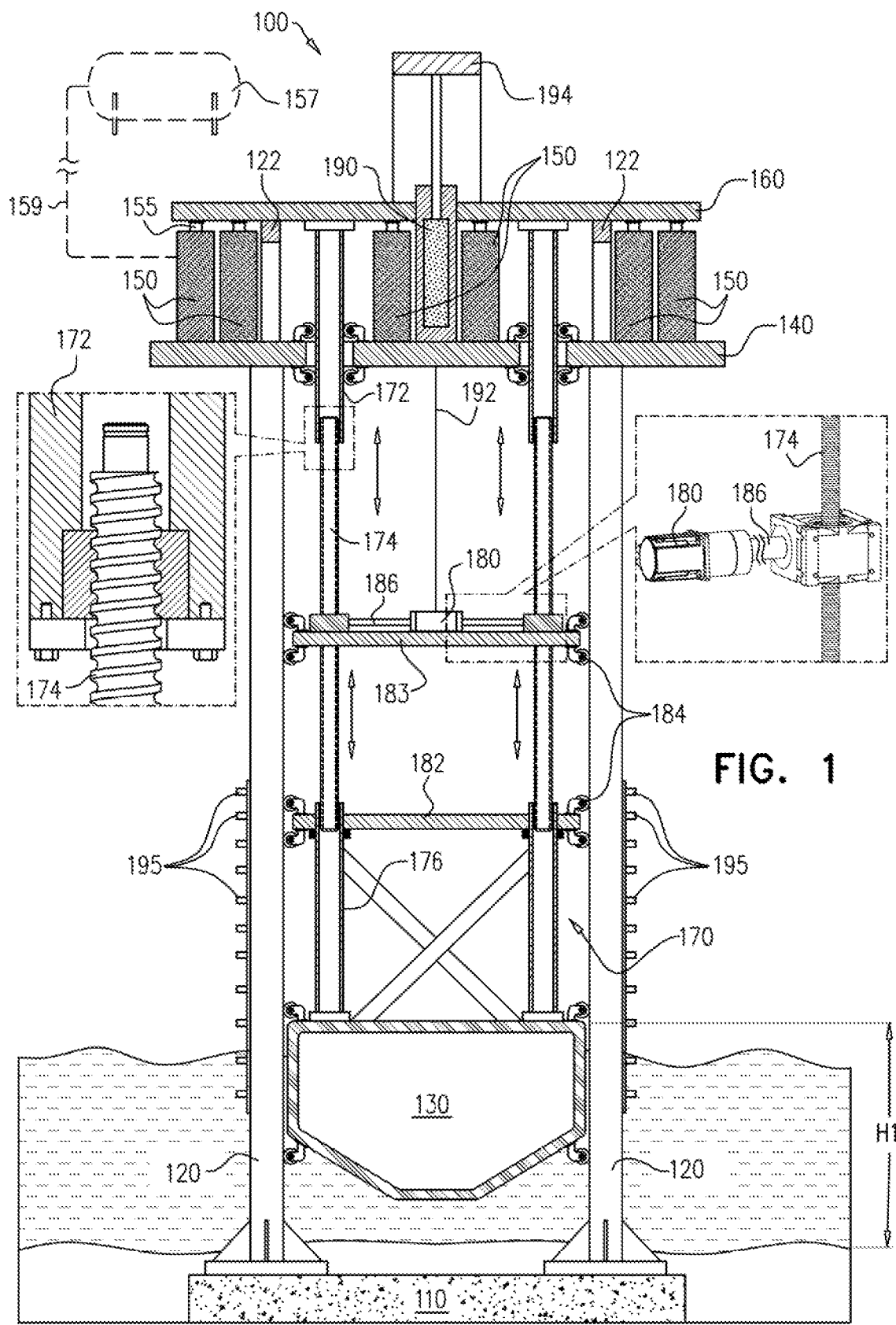
FIG. 1 is a schematic illustration of a system for producing compressed air from ocean waves shown during a low tide, according to an exemplary embodiment of the disclosure.
Figures 2, 2A:
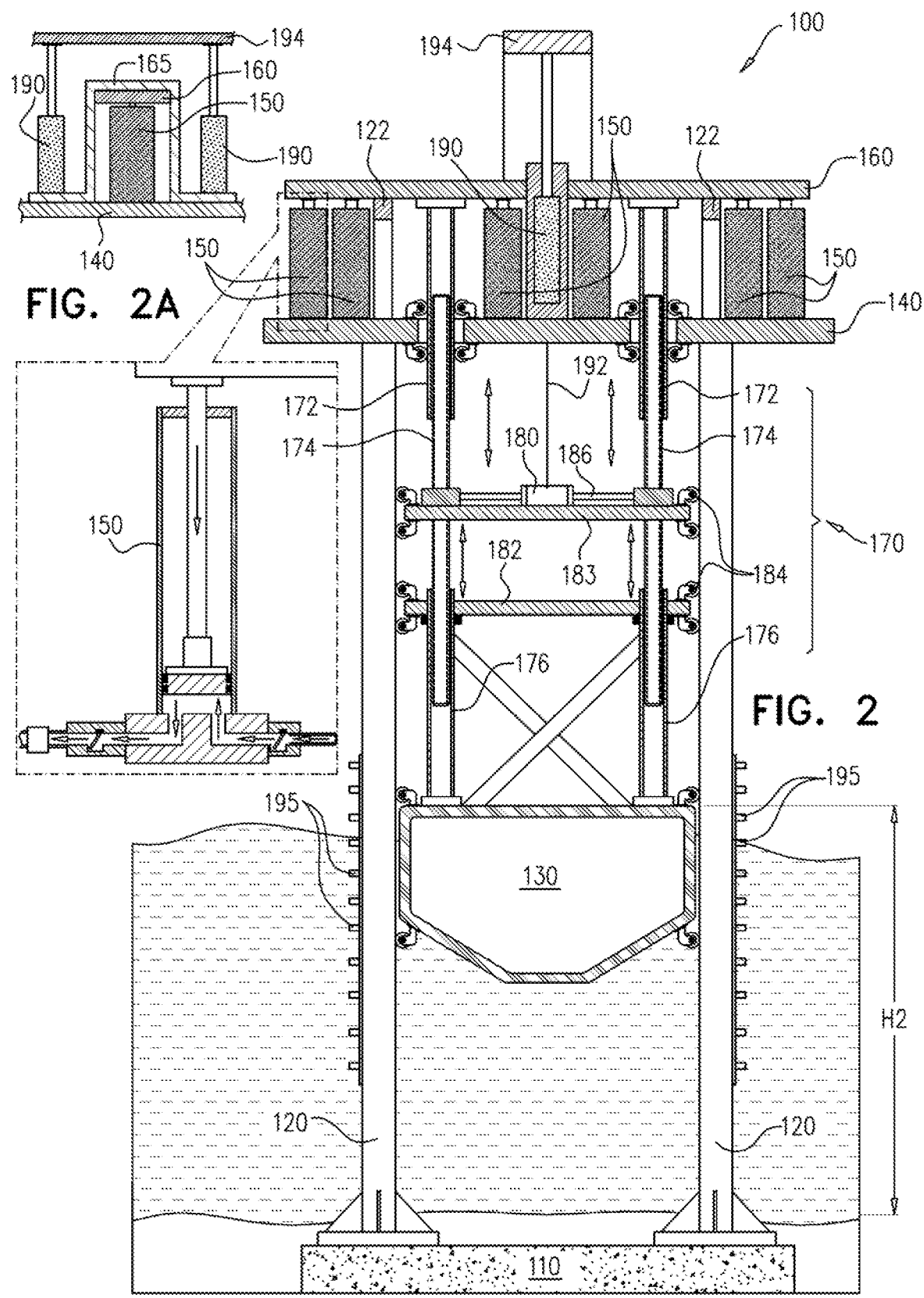
FIG. 2 is a schematic illustration of a system for producing compressed air from ocean waves shown during a high tide, according to an exemplary embodiment of the disclosure.
FIG. 2A is a schematic illustration of a cross sectional view of a platform for holding pneumatic pumps and hydraulic pumps, according to an exemplary embodiment of the disclosure.

FIG. 1 is a schematic illustration of a system 100 for producing compressed air from ocean waves shown during a low tide and FIG. 2 is a schematic illustration of system 100 for producing compressed air from ocean waves shown during a high tide, according to an exemplary embodiment of the disclosure.

In an exemplary embodiment of the disclosure, system 100 includes a base 110, which is anchored on the ocean floor and includes two or more columns 120 extending perpendicularly upward from the base above the surface of the ocean to serve as guiding tracks for a float 130 that moves upward and downward under the influence of ocean waves. Optionally, the base 110 is made from a dense material (e.g. cement or rocks) so that it remains stationary on the ocean floor. Alternatively it may be attached to the ocean floor by drilling holes in the ocean floor and having rods extend downward from the base into the holes. Likewise other methods may be used to anchor the base as known in the art. In some embodiments of the disclosure, each column 120 may be rooted to the ocean floor independently with its own base 110.

In an exemplary embodiment of the disclosure, a platform 140 is positioned at the top of the columns 120. Optionally, one or more pneumatic pumps 150 are placed on top of platform 140, to create compressed air. In an exemplary embodiment of the disclosure, the float 130 is moveably positioned between the columns 120. One or more elongated shafts 170 extend upward from the float 130 supporting a hammer head 160 to drive it up and down by the motion of the float 130. The hammer head 160 is positioned to move in a predefined range relative to platform 140 lifting and lowering a plunger 155 to create compressed air with pumps 150. The compressed air is optionally transferred by pipes 159 to be stored in a remote reservoir 157 that may be located on shore, nearby in the ocean in a floating reservoir or on platform 140.

In an exemplary embodiment of the disclosure, elongated shaft 170 is made up from three elements:

1. an upper shaft 172 that is coupled to the hammer head 160;

2. a lower shaft 176 that is coupled to the float 130; and 3. an adjusting rod 174 for adjusting the length of elongated shaft 170.

Optionally, adjusting rod 174 is threaded so that when rotated it can extend or reduce the length of elongated shaft 170. In an exemplary embodiment of the disclosure, the upper shaft 172 is right threaded and lower shaft 176 is left threaded or vice versa, so that when rotated both sides (upper shaft 172 and lower shaft 176) will move closer and reduce the length of elongated shaft 170 or both sides will move away from each other and extend the length of elongated shaft 170. In an exemplary embodiment of the disclosure, the elongated shaft 170 may be extended up to about 10 meters In some embodiments of the disclosure, a motor 180 is used to rotate adjusting rod 174. Optionally, motor 180 is supported by an upper support beam 183 or a lower support beam 182 that is coupled to elongated shaft 170 between columns 120. The support beams (182, 183) also serve to keep the elongated shafts 170 steady (e.g. at an equidistance) relative to each other and move with the elements of elongated shaft 170 (e.g. using guide wheels 184). In an exemplary embodiment of the disclosure, a hydraulic pump 190 is located on platform 140. Optionally, the hydraulic pump 190 uses oil to drive motor 180 (via pipes 192) and adjust the height of elongated shaft 170. FIG. 2A is a schematic illustration of a cross sectional view of platform 140 for holding pneumatic pumps 150 and hydraulic pumps 190, according to an exemplary embodiment of the disclosure. In an exemplary embodiment of the disclosure, the hydraulic pump 190 includes two pistons that are placed on an omega 165. Optionally, omega 165 is coupled to hammer head 160 so that the body of the hydraulic pump 190 is raised and lowered with hammer head 160 (see also FIG. 3). Optionally, a head 194 is held stable relative to platform 140 above hammer head 160 so that the hydraulic pump 190 is activated when hammer head 160 rises relative to platform 140 and pneumatic pump 150 is activated when hammer head 160 is lowered back toward platform 140.

In an exemplary embodiment of the disclosure, platform 140 is at a constant height. When the tide is low (e.g. as shown in FIG. 1) elongated shaft 170 is lengthened so that float 130 is positioned on the surface of the ocean (e.g. at height H1) to move hammer head 160 in the predefined range relative to platform 140 and produce compressed gas. Optionally, when the tide rises (e.g. as shown in FIG. 2) the float 130 rises (e.g. to height H2) and elongated shaft 170 is adjusted to be shorter so that hammer head 160 will continue to operate correctly in the predefined range.

In some embodiments of the disclosure, adjusting the length of elongated shaft 170 is done by instructions of an operator, for example at specific times based on knowledge of the tides. Alternatively, adjusting is performed automatically by a controller 510 (see FIG. 5). Optionally, controller 510 may include a computer or a dedicated electronic circuit, which may have a processor and memory. In an exemplary embodiment of the disclosure, one or more sensors 195 are installed on columns 120 to determine if the tide is rising or falling, for example when the water level is constantly above a certain sensor 195 or certain sensor 195 on all sides of system 100. Optionally, the surface level is calculated as a function of the measurements of the sensors 195. In some embodiments of the disclosure, controller 510 may be preprogrammed with the tide levels or may be connected over a network to a remote computer (e.g. over the Internet) to receive tide level information. In some embodiments of the disclosure, the length of elongated shaft 170 is adjusted automatically based on the output of pumps 150 and/or the strength of the force lifting hammer head 160. When the length of elongated shaft 170 is optimally set the output of compressed air from system 100 is increased. In the edge cases if elongated shaft 170 is set too short, float 130 will be hanging in the air and hammer head 160 will not rise. Likewise if elongated shaft 170 is set too long, hammer head 160 will remain constantly up and not produce compressed air. Accordingly, controller 510 instructs motor 180 to extend or shorten the length of elongated shaft 170 to neutralize the effect of the tide, so that only the ocean waves will affect the motion of the hammer head and optionally keep hammer head 160 within a predefined motion range. Optionally, the top of column 120 is covered with a soft material or elastic material to serve as a stopper 122 that softens the decent of hammer head 160, limits the range of motion and prevents it from breaking pneumatic pumps 150.

In an exemplary embodiment of the disclosure, when controller 510 determines that the length of elongated shaft 170 should be reduced or extended, hydraulic pump 190 is used to drive motor 180, which rotates drive shafts 186 that rotate adjusting rod 174. In some embodiments of the disclosure, motor 180 is an electric motor and instead of using hydraulic pump 190 electric power can be provided from an external source to drive motor 180, for example from the power plant or facility to which the compressed air is provided.

Figure 3:
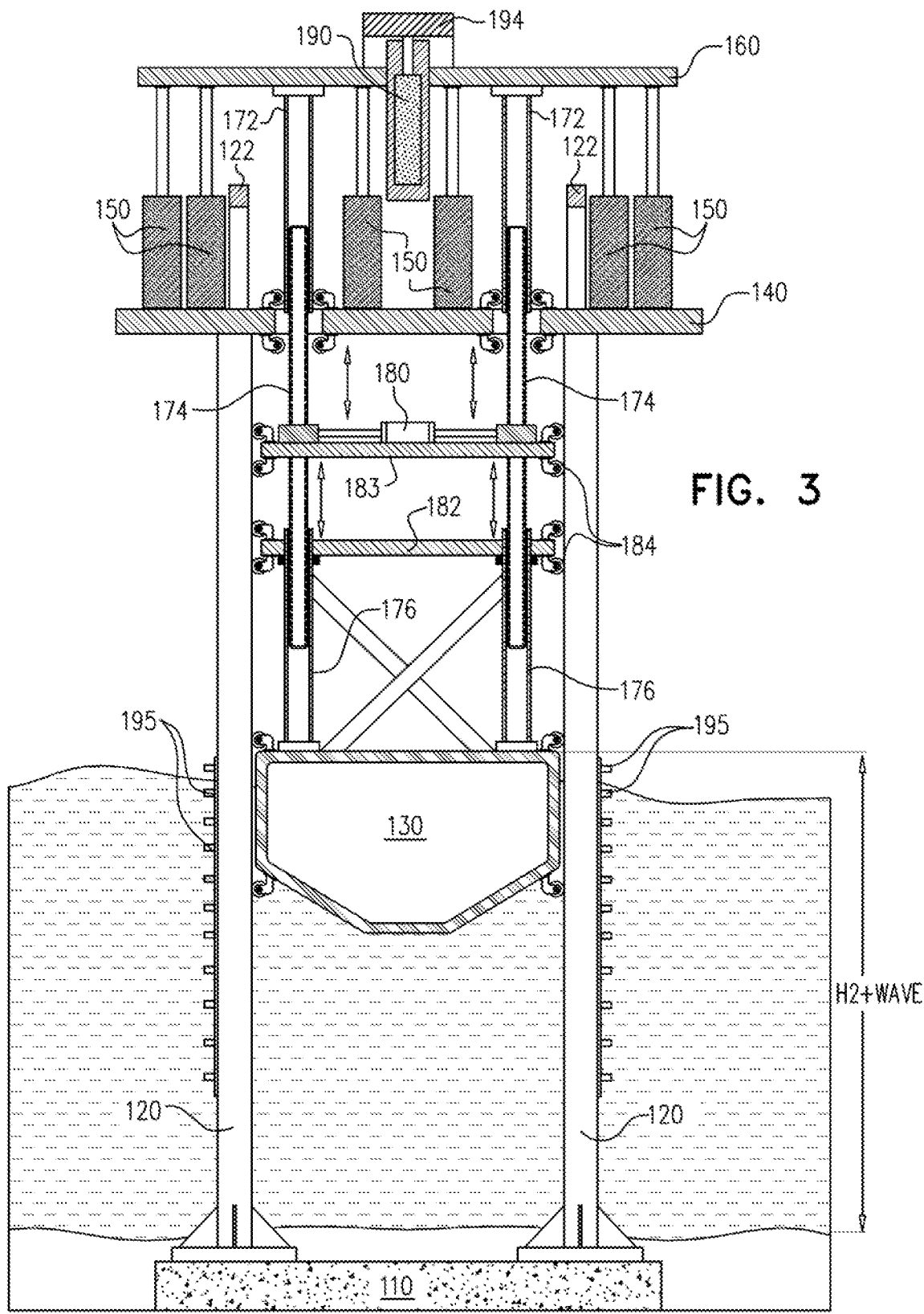
FIG. 3 is a schematic illustration of a system for producing compressed air from ocean waves shown during a high tide and raised by a wave, according to an exemplary embodiment of the disclosure.

FIG. 3 is a schematic illustration of system 100 for producing compressed air from ocean waves shown during a high tide and raised by a wave, according to an exemplary embodiment of the disclosure. As shown in FIG. 3 elongated shaft 170 was shortened and hammer head 160 is lifted. When the wave pulls back, hammer head 160 goes back down and produces compressed air with pumps 150 and plungers 155. In an exemplary embodiment of the disclosure, system 100 can selectively turn on and/or turn off each pump 150, for example so that a specific pump will not produce compressed air or will release the compressed air and not transfer it to reservoir 157. Optionally, controller 510 can turn off pumps 510 responsive to the status of compressed air in reservoir 157, for example if the reservoir is full stop production of compressed air from some of the pumps 150.

Figure 4:
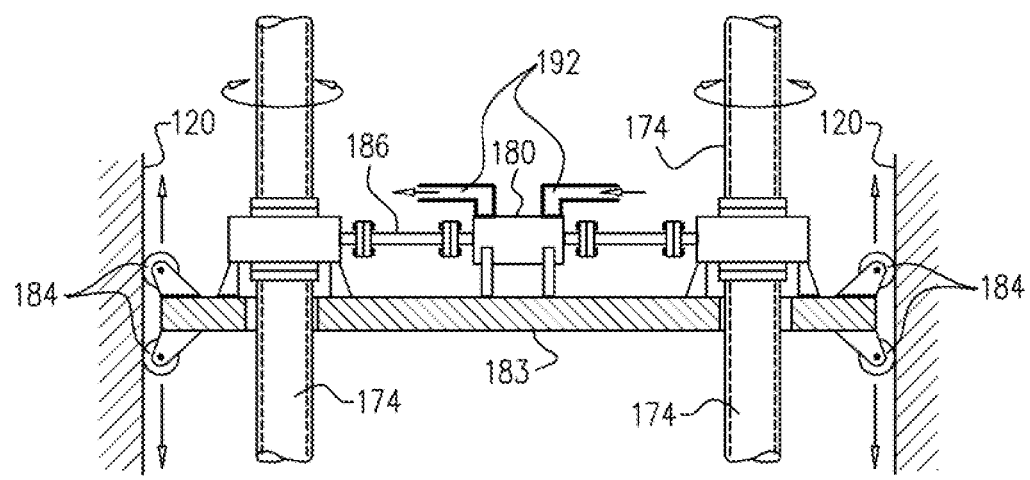
FIG. 4 is a schematic illustration of a motor for adjusting the height of a system for producing compressed air from ocean waves, according to an exemplary embodiment of the disclosure.

FIG. 4 is a schematic illustration of motor 180 for adjusting the height of system 100 for producing compressed air from ocean waves, according to an exemplary embodiment of the disclosure. Optionally, when controller 510 enables adjustment of elongated shaft 170, hydraulic pressure from hydraulic pump 190 is provided by pipes 192 to motor 180. Motor 180 rotates drive shaft 186 that rotates adjusting rod 174. Appropriate gears and pulleys are used as known in the art. Adjusting rod 174 enters deeper into upper shaft 172 and lower shaft 176 to shorten elongated shaft 170 or begin to pull out from them to lengthen elongated shaft 170. Optionally, guide wheels 184 allow support beam 182 and support beam 183 to rise or descend along columns 120 as elongated shaft 170 is shortened or extended.

Figure 5:
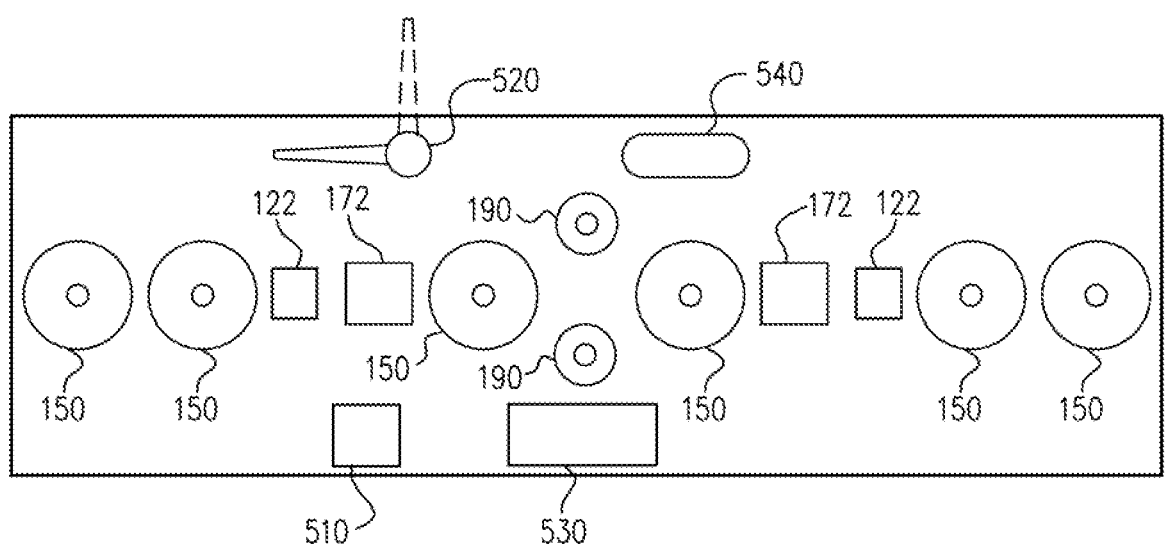
FIG. 5 is a schematic illustration of a cross sectional top view of a system for producing compressed air from ocean waves, according to an exemplary embodiment of the disclosure.

FIG. 5 is a schematic illustration of a cross sectional top view of system 100 for producing compressed air from ocean waves (hammer head 160 was removed to illustrate elements on platform 140), according to an exemplary embodiment of the disclosure. In an exemplary embodiment of the disclosure, platform 140 is stationary on the top of columns 120 so items stored there are not affected by motion of the system 100. Optionally, platform 140 accommodates controller 510 that controls the pneumatic pumps 150 and the hydraulic pump 190 as explained above. In an exemplary embodiment of the disclosure, platform 140 additionally accommodates pneumatic pumps 150, hydraulic pump 190, an oil reservoir 530 and a pressurized oil tank 540 that provide incoming and outgoing oil for hydraulic pump 190. In some embodiments of the disclosure, platform 140 also accommodates a crane 520 for lifting items (e.g. pumps 150) onto platform 140.

In some embodiments of the disclosure, oil reservoir 530 stores oil and hydraulic pump 190 compresses oil in pressurized oil tank 540 to activate hydraulic pressure when necessary. Alternatively or additionally, the hydraulic pressure may be applied as it is created by hammer head 160.

Figure 6:
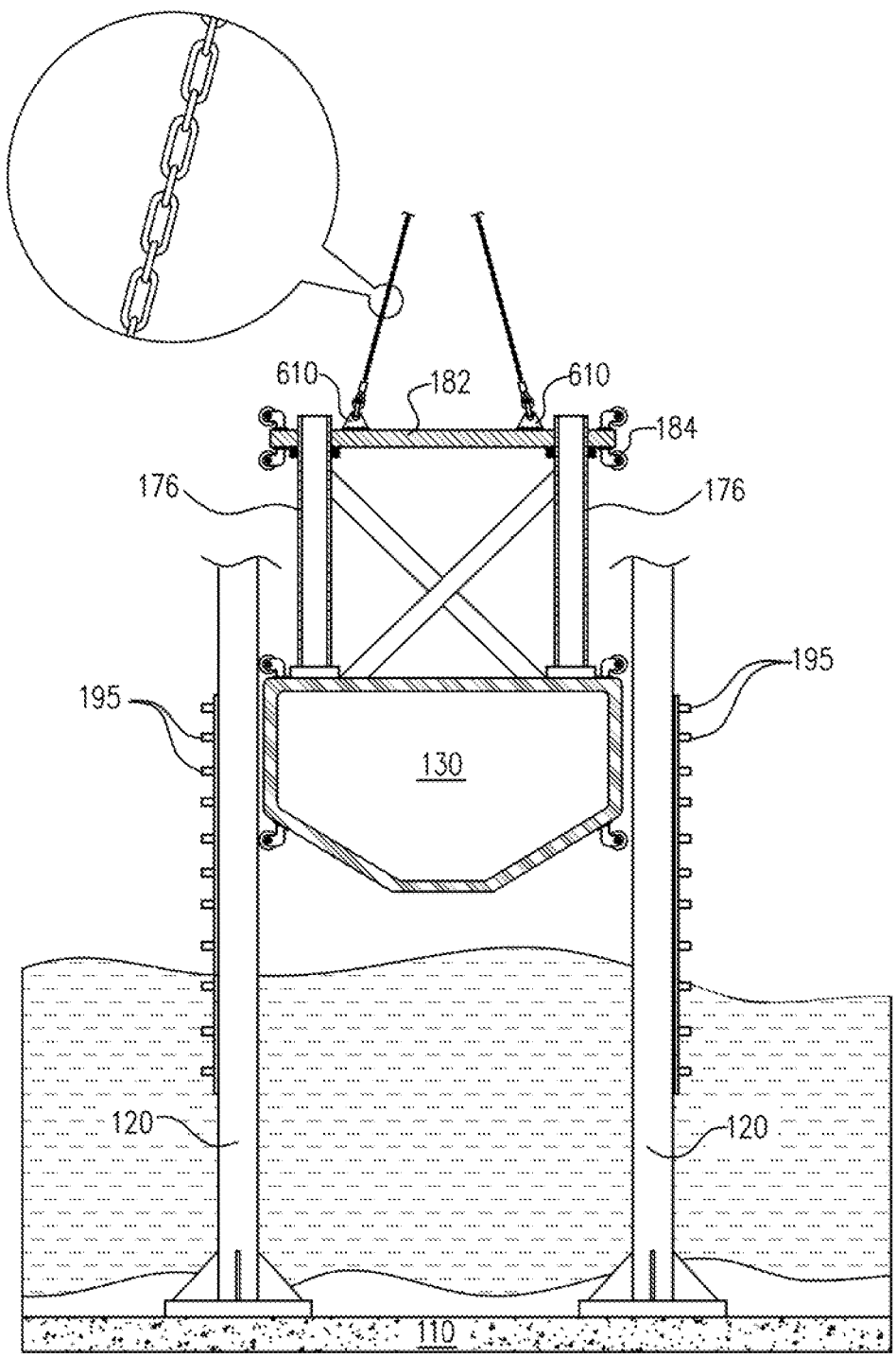
FIG. 6 is a schematic illustration of a step during assembly and/or disassembly of a system for producing compressed air from ocean waves, according to an exemplary embodiment of the disclosure.

FIG. 6 is a schematic illustration of a step during assembly and/or disassembly of system 100 for producing compressed air from ocean waves, according to an exemplary embodiment of the disclosure. In an exemplary embodiment of the disclosure, platform 140 is removed from the top of columns 120 and then upper shaft 172, adjusting rod 174, motor 180 are removed. Afterwards float 130 with lower shaft 176 and lower support beam 182 are lifted out from between columns 120 with a crane (not shown). Likewise when assembling system 100, float 130 with lower shaft 176 are lowered in between columns 120 before adding adjusting rod 174 and upper shaft 172. Optionally, lower support beam 182 includes hinges. 610 connected to the lower support beam 182 to help lift lower support beam 182. In some embodiments of the disclosure, columns 120 include rails or tracks (not shown) that match guide wheels 184 to confine float 130 to slide between columns 120.

Figure 7:
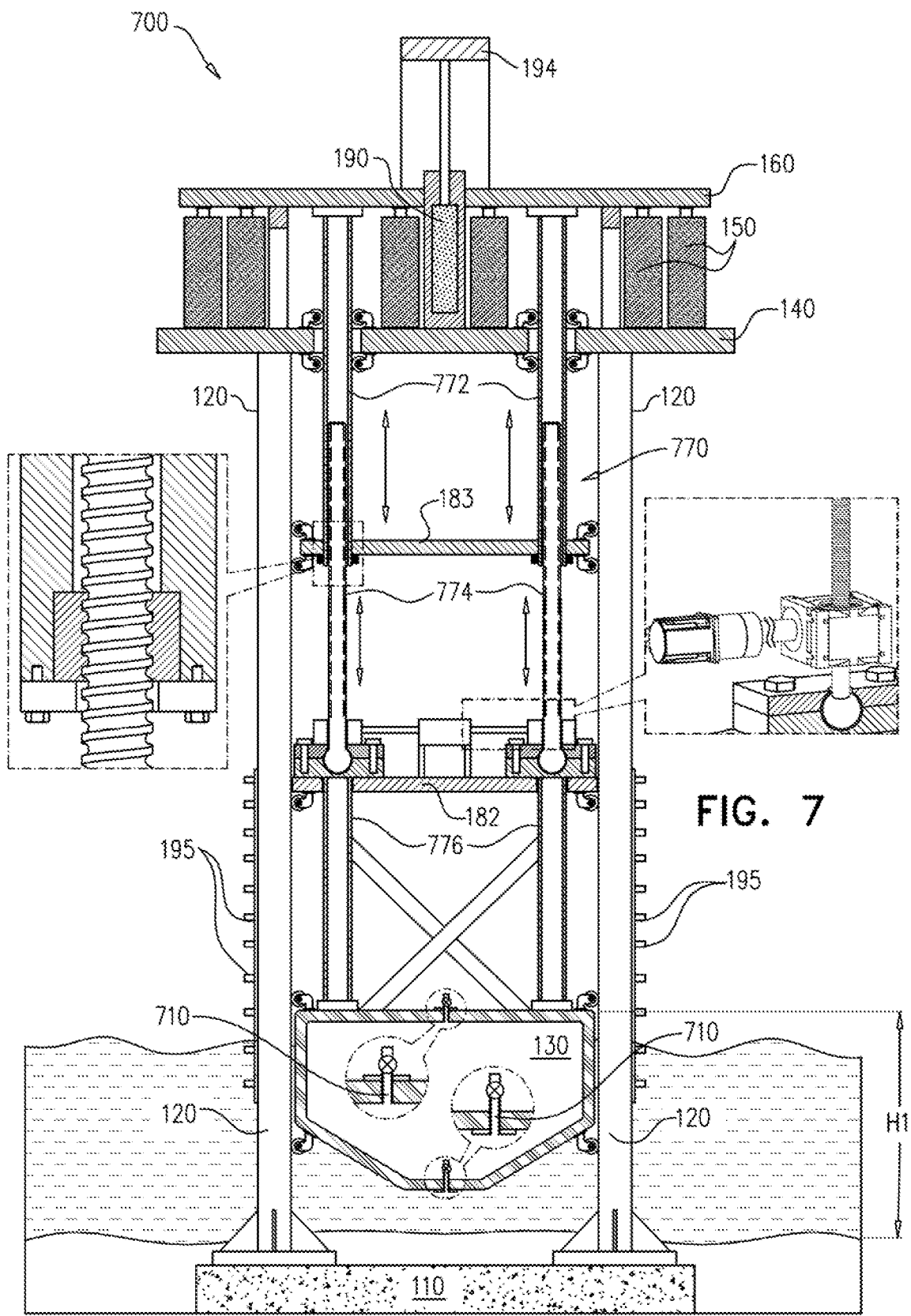
FIG. 7 is a schematic illustration of an alternative system for producing compressed air from ocean waves, according to an exemplary embodiment of the disclosure.

FIG. 7 is a schematic illustration of an alternative system 700 for producing compressed air from ocean waves, according to an exemplary embodiment of the disclosure. System 700 is similar to system 100 having similar elements except that elongated shaft 770 replaces elongated shaft 170. Elongated shaft 770 includes an upper shaft 772, an adjusting rod 774 and a lower shaft 776. In an exemplary embodiment of the disclosure, only upper shaft 772 and adjusting rod 774 participate in shortening and/or extending elongated shaft 770. Optionally, adjusting rod 774 is threaded and screws into upper shaft 772. Optionally, when rotating adjusting rod 774, elongated shaft 770 is shortened or extended depending on the direction of rotation. In an exemplary embodiment of the disclosure, lower shaft 776 is of a constant size and independent from adjusting rod 774 and upper shaft 772. Optionally, lower shaft 776 is connected and confined between float 130 and the lower support beam 182 on which motor 180 resides.

In an exemplary embodiment of the disclosure, float 130 includes valves 710 that allow the float 130 to be filled with water to have it sink down, for example during a storm. Likewise compressed air may be forced into float 130 e.g. from air reservoir 157 to cause the float to float on the surface of the ocean. Alternatively or additionally, elongated shaft may be based on hydraulic pistons to be extended and shortened.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure. It will also be appreciated by persons skilled in the art that the present disclosure is not limited to what has been particularly shown and described hereinabove.

I claim:

1. A system for producing compressed air from ocean waves, comprising:
   a base for anchoring the system on an ocean floor;
   two or more columns extending perpendicularly upward from said base to above an ocean surface;
   a platform at an upper end of the columns;
   one or more air pumps located on said platform;
   a hammer head coupled to the one or more air pumps for producing said compressed air by raising and lowering the hammer head in a predefined motion range;
   a float that floats on the ocean surface and is confined by the two or more columns, the base and the platform;
   one or more elongated shafts coupled to said float at one end and to said hammer head at another end; wherein the hammer head is adapted to be raised and lowered by the float in the predefined motion range by motion of the ocean waves;
   wherein the one or more elongated shafts have a length that is adjustable to keep the hammer head in the predefined motion range and the float on the ocean surface in response to a change in a height of the ocean surface; and
   wherein the length of the one or more elongated shafts is adjusted automatically by a controller and a motor.

2. A system according to claim 1, wherein the controller receives measurements of the height of the ocean surface from sensors located on the two or more columns.

3. A system according to claim 1, wherein the controller receives measurements of the height of the ocean surface from a remote computer.

4. A system according to claim 1, wherein the system includes a hydraulic pump that provides hydraulic pressure to the motor to adjust the length of the one or more elongated shafts.

5. A system according to claim 4, wherein when the hammer head is lifted it produces hydraulic pressure and when the hammer head is lowered it produces said compressed air.

6. A system according to claim 1, wherein the system can selectively activate each air pump of the one or more air pumps.

7. A system according to claim 1, wherein said compressed air from the one or more air pumps is stored in a reservoir.

8. A system according to claim 1, wherein each of the one or more elongated shafts includes an upper shaft connected to the hammer head, a lower shaft connected to the float and an adjusting rod in between; wherein when the adjusting rod is rotated in one direction its upper part increasingly overlaps the upper shaft and its lower part increasingly overlaps the lower shaft; and when the adjusting rod is rotated in an opposite direction its upper part decreasingly overlaps the upper shaft and its lower part decreasingly overlaps the lower shaft.

9. A system according to claim 1, wherein each of the one or more elongated shafts includes an upper shaft connected to the hammer head, a lower shaft connected to the float and an adjusting rod in between; wherein when the adjusting rod is rotated in one direction its upper part increasingly overlaps the upper shaft; and when the adjusting rod is rotated in an opposite direction its upper part decreasingly overlaps the upper shaft; and
   wherein the lower shaft does not overlap with the adjusting rod.

10. A system according to claim 1, wherein each of the one or more elongated shafts includes an upper shaft connected to the hammer head, a lower shaft connected to the float and an adjusting rod in between; wherein the adjusting rod is threaded to be screwed into the upper shaft and/or the lower shaft.

11. A system according to claim 1, wherein the float includes valves for selectively filling the float with said compressed air or ocean water.

12. A system for producing compressed air from ocean waves, comprising:
   a base for anchoring the system on an ocean floor;
   two or more columns extending perpendicularly upward from said base to above an ocean surface;
   a platform at an upper end of the columns;
   one or more air pumps located on said platform;
   a hammer head coupled to the one or more air pumps for producing said compressed air by raising and lowering the hammer head in a predefined motion range;
   a float that floats on the ocean surface and is confined by the two or more columns, the base and the platform;
   one or more elongated shafts coupled to said float at one end and to said hammer head at another end; wherein the hammer head is adapted to be raised and lowered by the float in the predefined motion range by motion of the ocean waves;
   wherein the one or more elongated shafts have a length that is adjustable to keep the hammer head in the predefined motion range and float on the ocean surface in response to a change in a height of the ocean surface; and
   wherein the system includes one or more support beams that keep multiple elongated shafts of the one or more elongated shafts at an equidistance from each other.

13. A system according to claim 12, wherein the support beams include guide wheels that interface between the one or more elongated shafts and the two or more columns.

14. A system according to claim 12, wherein a motor for controlling the length of the one or more elongated shafts is supported by a support beam.

15. A method for producing compressed air from ocean waves, comprising:
   anchoring a base on an ocean floor;
   extending two or more columns perpendicularly upward from said base to above an ocean surface;
   placing a platform at an upper end of the two or more columns;
   positioning one or more air pumps on said platform;
   coupling a hammer head to the one or more air pumps to produce said compressed air by raising and lowering the hammer head in a predefined motion range;
   confining a float that floats on the ocean surface by the base, platform and the two or more columns;
   connecting one or more elongated shafts between said float and said hammer head, so that the hammer head is raised and lowered by the float in the predefined motion range by motion of the ocean waves;
   adjusting a length of the one or more elongated shafts to keep the hammer head in the predefined motion range and the float on the ocean surface in response to a change in a height of the ocean surface; and
   wherein the length of the one or more elongated shafts is adjusted automatically by a controller and a motor.

16. A method according to claim 15, wherein the controller receives measurements of the height of the ocean surface from sensors located on the columns.

17. A method according to claim 15, wherein the system includes a hydraulic pump that provides hydraulic pressure to the motor to adjust the length of the one or more elongated shafts.

18. A method according to claim 17, wherein when the hammer head is lifted it produces hydraulic pressure and when the hammer head is lowered it produces compressed air.

* * * * *